Figure 1:
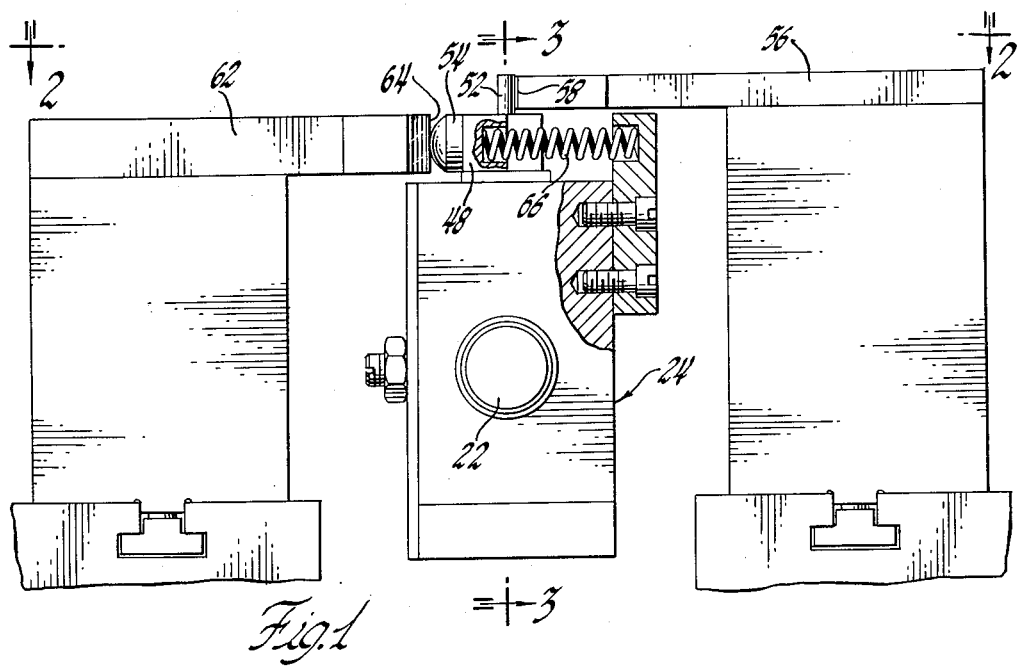

INVENTORS
C. Glen Barkley &
BY William Q. Fletcher

C. P. Barnard
ATTORNEY

INVENTORS
C. Glen Barkley &
BY William O. Fletcher
C. P. Barnard
ATTORNEY

United States Patent Office 3,067,635
Patented Dec. 11, 1962

3,067,635
RECESSED BORING FIXTURE
C. Glen Barkley and William A. Fletcher, Grand Rapids, Mich., assignors to General Motors Corporation, Detroit, Mich., a corporation of Delaware
Filed Jan. 4, 1960, Ser. No. 113
1 Claim. (Cl. 77—58)

This invention relates to a recessed boring fixture and more particularly to control apparatus for positioning a cutting tool within a bore to form a recessed or enlarged portion therein.

One of the difficulties involved in providing a recess within a preformed bore is obtaining sufficient sturdiness and rigidity of the cutting tool so that during the cutting operation a minimum of tool chatter is produced within the bore. In order to obtain an adequate support for the cutting tool, previous apparatus have sacrificed strength and rigidity or have resulted in intricate tool holding mechanisms with a number of expensive parts that are complicated to assemble and require costly maintenance.

A principal object of this invention is to provide a tool holder comprising a minimum number of parts being constructed and arranged so that a tool of maximum size for sturdiness and rigidity may be utilized to reduce chatter resulting from the cutting operation.

Further objects of this invention are to integrate a cam guide mechanism with a tool holder in a more efficient way to provide rigid support of a tool, to promote accuracy and obviate rapid deterioration of the component parts.

The foregoing objects are accomplished by providing a pivotally mounted tool holder that is linked through a cam follower device to a cam template contoured to guide the tool into a bore and to a position within the bore whereat an enlargement or recessed portion is to be cut. Although previous devices have used cammed surfaces to guide a cutting tool into working position none of the previous devices has utilized a simple efficient tool holder permitting the use of a cutting tool of maximum thickness rotatable as a unit with the tool holder to obtain maximum rigidity. The cam portion pivots the tool and the tool holder so that the cutting edge is moved radially into the wall of the bore to cut out the enlargement. Since the cutting tool is rigidly secured within the tool holder and only the tool holder moves to engage the cutting surface, the tool has no movement in relation to the holder and therefore no wear surfaces as compared with a similar arrangement wherein the cutting tool itself is moved into engagement by adjustment within the tool holder. Furthermore, the pivotal axis of the tool holder is located as closely adjacent the opening of the bore as possible during the cutting operation to permit the use of a tool of maximum thickness while retaining the desired range of radial clearance between the bore and the tool.

Figure 2:
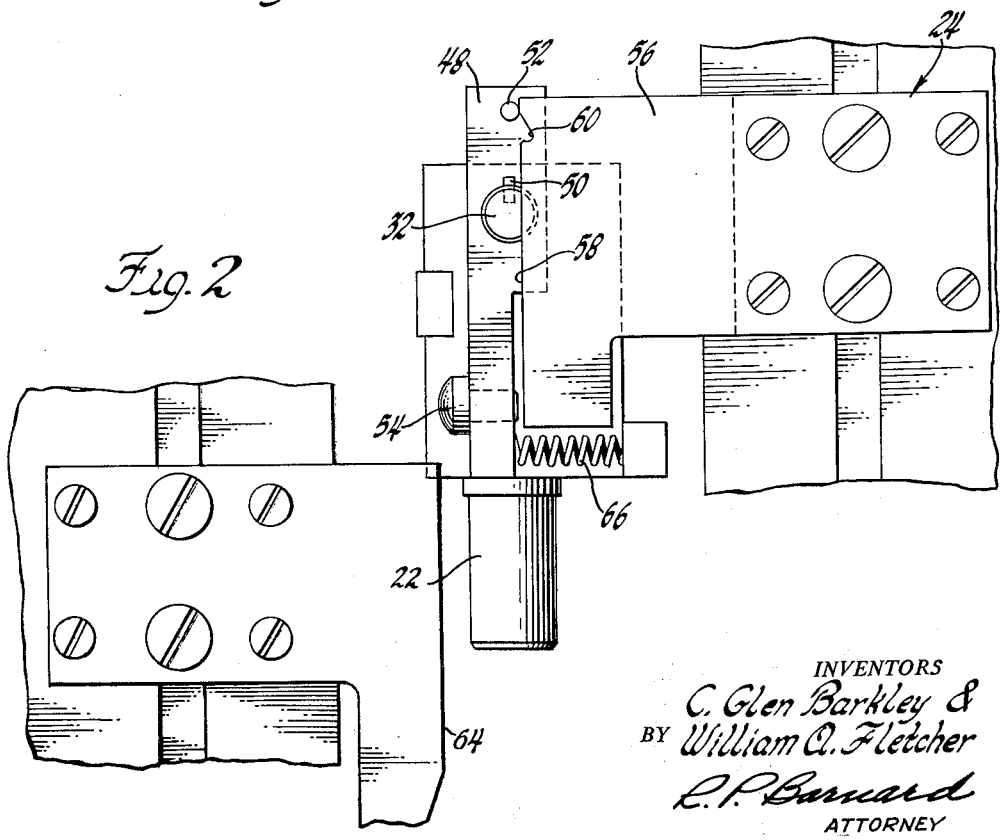
Figure 3:
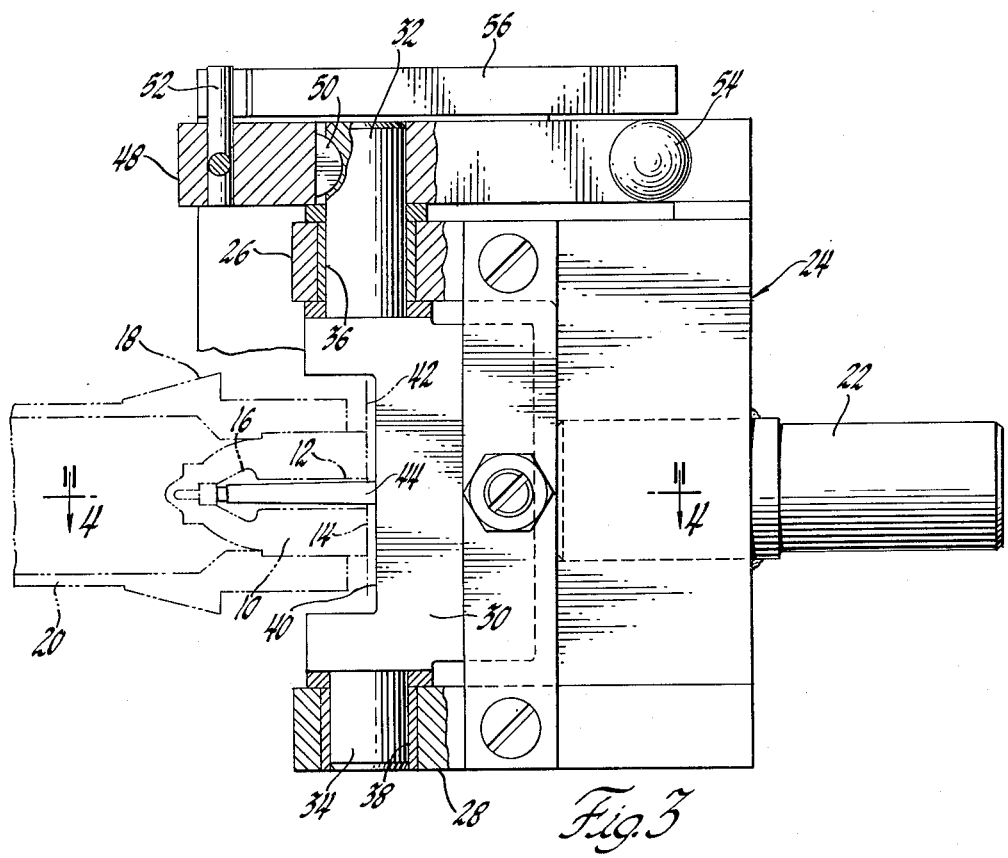
Figure 4:
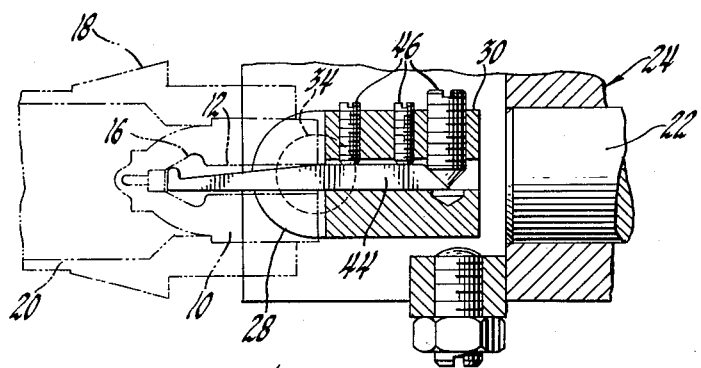

Other objects and advantages will be set forth in detail in the following description of the invention as illustrated in the accompanying drawings wherein:

FIGURE 1 is a front elevational view of the invention;
FIGURE 2 is a top plan view of the apparatus; and
FIGURE 3 is a longitudinal sectional view taken along the line 3—3 in FIGURE 1.
FIGURE 4 is a detail view of a portion of the apparatus.

A workpiece 10 is shown in FIGURES 3 and 4 supported adjacent the recessed boring fixture of this invention. The workpiece is shown with a hole of the desired final shape to be bored, including a substantially straight bore 12 extending inwardly from the access end at surface 14 of the workpiece and an enlargement or recess 16 inwardly remote from access end of the workpiece. The workpiece may be secured in a collet 18 mounted on a rotatable shaft of an automatic screw machine or similar machinery.

As shown in FIGURE 3, a turret (not shown) of the automatic screw machine receives a support shaft 22 of a bifurcated tool holding fixture 24 comprising supporting arms 26, 28 pivotally supporting a boring tool holding yoke 30. The yoke 30 is provided with a pair of pivot shafts 32 and 34 which extend through corresponding holes 36 and 38 provided on the support arms. The tool holding yoke is provided with a recess 40 having a cross-sectional area sufficient to accommodate a portion of the workpiece 10 therewithin during the work cycle so that the pivotal axis 42 of the holding yoke is substantially aligned with the end surface 14 of the workpiece 10 during the work cycle, i.e., the operation of cutting the recess 16 in the bore 12 of the workpiece 10. A cutting tool 44 is secured within the recess 40 by suitable means such as a series of set screws 46 shown in detail in FIGURE 4. A control lever 48 is connected by a key 50 to the upper end of the pivot shaft 32. One side of the control lever is provided with a cam follower pin 52 and the other side of the control lever is provided with a guide button 54.

As shown in FIGURE 1, a cam template 56 is mounted on the rear cross slide of the screw machine. The cam template is provided with a cam surface 58 contoured in exactly the same configuration as the contour of the inside of the bore 12 and having a portion 60 identically positioned on the cam surface as the recess 16 in the bore. The cam surface is supported in exact alignment with the bore 12 above the workpiece 10. A guide shoe 62 is mounted on the front cross slide of the screw machine and provides an abutting surface 64 for the guide button 54. A compression spring 66 is seated against the control lever adjacent its end opposite the guide button to maintain engagement with the guide shoe.

In operation a workpiece 10 with a bore 12 is mounted in the collet 18 and a suitable boring tool 44 is placed in the tool holding yoke 30. A cam template 56 having a contoured surface 58 with the desired configuration is then mounted on the rear cross slide; and the portion of the cam surface corresponding to bore 12 is exactly aligned with the bore 12 in a plane parallel to the central axis thereof. The tool holding fixture 24 is mounted on the support shaft 22 which is controlled by a special cam (not shown) on the screw machine in a conventional manner. One revolution of this cam on the machine gives a fixed number of cuts to produce the recess in the workpiece 10 as desired. After the fixture and cam template are mounted, a cycle of operation is initiated by linear movement of the turret and fixture on a slide toward the workpiece 10 which is rotated by the shaft 20. The control lever 48 advances between the cam template 56 and the guide shoe 62 with the guide button 54 maintained in engagement with the guide shoe 62 and cam follower pin 52 maintained in engagement with the cam surface 58 by the compression spring 66. The function of button 54 is to rotate pin 52 counterclockwise away from plate 62 during insertion of the tool between the plate 62 and the template 56. Thus the cutting tool 44 is guided into the bore 12 of the workpiece to the work area represented by the recess portion 60 on the cam surface 64. As the guide button 54 moves away from the guide shoe 62 and the follower pin 52 moves into the recess portion 60, the control lever 48 will cause the tool holding yoke 30 and the tool 44 to be pivoted about the shafts 32 and 34. The cutting edge of the tool will therefore be maintained in engagement with the wall of the bore 12 until the desired configuration, identical to the recess portion 60 on the cam surface 64, has been formed. It is to be noted that at the completion of the cutting or work cycle the end surface 14 of the workpiece 10 is in substantially parallel alignment with the pivotal axis 42 as shown in FIGURE 3. Such an arrangement permits maximum radial displacement of the cutting tool within the bore 12. Most of the work cycle occurs with the end surface 14 closely adjacent the pivotal axis 42 as the recess 40 on the tool holding yoke 30 accommodates the workpiece 10. After a cycle is completed, components of the fixture are returned to their normal or beginning position by suitable control mechanisms of the screw machine and are ready to repeat the cycle on a new part.

While the invention has been herein shown and described with reference to a specific embodiment, it is to be understood that the details and construction of the combination and arrangement of the several parts may be modified in some instances without departing from the spirit and scope of the invention as indicated by the appended claim.

What we claim is:

In a fixture for supporting a boring tool during axial movement of the tool inwardly and outwardly of a bore extending from one end of a workpiece and for guiding pivotal movement of the tool about an axis opposite said workpiece end to effect an enlargement of said bore at a distance inwardly thereof from said end, an axially movable support shaft having spaced-apart arms forming a bifurcated end of said shaft, a yoke having oppositely extending shafts journaled in said arms and defining an axis of pivotal movement of the yoke within said shaft bifurcated end, means in said yoke for fixedly securing a boring tool normal to said axis, said yoke defining a recess intermediate the adjacent ends of said journaled shafts adapted to face and receive the end of the workpiece during said inward movement of the tool, said recess being of sufficient depth to accommodate pivotal movement of the yoke about said axis with said workpiece end extending thereto to said axis, one of said journaled shafts extending through its journaling arm, a yoke control lever keyed to said one journaled shaft and extending generally longitudinally of said support shaft, a stationary guide shoe and a stationary cam template oppositely facing said control shaft, said template having a cam surface of the same configuration as the contour of the enlargement to be effected in said workpiece bore, said cam surface being spaced from and angularly disposed about said pivotal axis for exact alignment with said bore enlargement to be effected, a button and a cam follower pin carried by said control arm, and a spring positioned between said journaling arm and said control arm biasing said control arm in one direction about said pivotal axis to maintain said button engaged with said guide shoe and said follower pin engaged with said cam surface during axial movement of said support shaft.

References Cited in the file of this patent

UNITED STATES PATENTS

| | | |
|---|---|---|
| 1,248,317 | Groene et al. | Nov. 27, 1917 |
| 1,659,386 | Van Hamersveld | Feb. 14, 1928 |
| 1,980,178 | Berglund | Nov. 13, 1934 |
| 1,989,227 | Craley | Jan. 29, 1935 |
| 2,121,934 | Sander et al. | June 28, 1938 |
| 2,818,753 | Leggett | Jan. 7, 1958 |

FOREIGN PATENTS

| | | |
|---|---|---|
| 811,063 | Germany | Aug. 16, 1951 |